United States Patent Office 3,312,933
Patented Apr. 4, 1967

3,312,933
TIME VARIANT INVERSE FILTER
Philip L. Lawrence, Riverside, Conn., and Jack T. Nipper, Dallas, Tex., assignors to Mobil Oil Corporation, a corporation of New York
Filed Apr. 23, 1964, Ser. No. 362,135
4 Claims. (Cl. 340—15.5)

This invention relates to the processiing of geophysical information and, more particularly, to methods of filtering geophysical data in a manner such that the filter response varies with time.

In the field of geophysical exploration, it has been found that seismograms, representing subsurface characteristics such as reflecting horizons, may be converted to a form which is more readily interpreted. This is accomplished by converting the seismogram to a form analogous to a velocity log which indicates the velocity of acoustic waves in the earth as a function of depth. Such logs are quite useful in locating oil-bearing subsurface formations. However, it is difficult and expensive to directly obtain velocity logs because a borehole must be drilled into the earth to obtain the acoustic velocity information from a logging tool which is lowered into the borehole.

It is possible to obtain synthetic velocity logs without the difficulty and expense attendant to drilling a borehole and logging it. Seismograms can be converted to a form similar to a velocity log by filtering the seismogram with a filter having characteristics which are the inverse of the filtering characteristics of the earth and the instruments used in obtaining the seismogram. An inverse filtering technique is described in U.S. Patent 3,076,177 which was issued on Jan. 29, 1963.

One effect of inverse filtering a seismogram is that the frequencies which are attenuated by the earth and the seismic instruments in obtaining the seismogram are re-inserted into the seismogram. This task is complicated by the fact that the earth has a frequency response which changes with depth. As a result, a seismogram will change in frequency content along the length of the record. Early arrivals from near-surface reflecting beds are represented by wavelets including relatively high frequency components, whereas later arriving reflections are represented by wavelets of predominantly low frequency components. Therefore, a selected inverse filter which is good for one portion of the record is not the proper inverse filter to convert other portions of the seismogram back to a function analogous to a velocity log.

Filters having characteristics which vary with time, commonly referred to as time variant filters, are known. In the copending application, Ser. No. 316,593, filed Oct. 16, 1963, to William H. Ruehle, and entitled Geophysical Data Processing, now U.S. Patent No. 3,281,776, there is disclosed a technique for filtering geophysical data in a manner which varies with time. The invention of the present application is an extension of the time variant filter technique to the field of inverse filtering of seismograms. More particularly, it is an object of this invention to provide a simplified technique for time variant inverse filtering.

This simplified technique includes obtaining the derivatives and the integrals of the functions representative of the seismogram. These derivatives and integrals emphasize, respectively, the high and the low frequency content of the seismogram. By mixing these integrals and derivatives in a programmed manner with the original seismogram function, there are reinserted into the seismogram the proper frequencies which were attenuated by the filtering characteristics of the earth and the recording instruments. Further, this mixing of the integrals and derivatives of the seismogram is controlled by a function which varies with time in accordance with the change of the frequency content with time on the seismogram. The control function may be obtained, for example, from the ratio of the magnitude of the first derivative of the seismogram function to the magnitude of the seismogram. Since the first derivative emphasizes the high frequency content of the seismogram, and since the high frequencies are increasingly attenuated with time along the seismogram, the ratio of the magnitudes decreases with time. Further, this ratio decreases in a manner indicative of the increasing high frequency attenuation with time. Therefore, this ratio is used as a control function to control the manner in which the derivatives and integrals of the seismogram are mixed to produce a time-corrected, or time invariant inverse filtered seismogram in which the frequency content has been equalized with time.

The foregoing and other objects, features, and advantages of this invention will be better understood from the following more detailed description in conjunction with the drawings in which.

Figure 2:
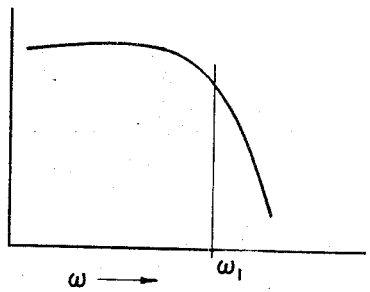
FIGURE 2 shows typical filter characteristics of the earth and instruments in the frequency domain.

Referring to FIGURE 2, there is shown a plot representative of a typical amplitude-frequency characteristic of a seismic trace filtered by the earth and the recording system. The filtering characteristics are such that the high frequencies tend to be attenuated. This is indicated in FIGURE 2 by a cut-off frequency at $\omega_1$, above which the seismic frequencies are greatly attenuated. The further the seismic wave travels through the earth, the more pronounced is the attenuation of the higher frequencies. Therefore, the seismic waves which travel furthest through the earth, that is, those at increasing record times on the seismogram, are more subject to high frequency attenuation. As time progresses on the seismograms, the cut-off frequency becomes lower and lower.

Figure 3A:
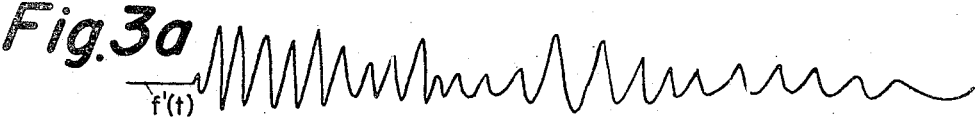
FIGURE 3a shows a seismogram function which has been differentiated.
Figure 3B:
FIGURE 3b shows a seismogram function.
Figure 3C:
FIGURE 3c shows a seismogram function which has been integrated.

In order to inverse filter a seismogram to convert it to a function similar to a velocity log, it is desirable to reinsert the frequencies which have been attenuated by the earth or by the earth and the frequency pass band of the seismic instruments. In accordance with this invention, this is accomplished by mixing the derivatives and the integrals of the seismogram in a programmed manner. Referring to FIGURE 3b, there is shown a typical seismogram function $f(t)$. When function $f(t)$ is differentiated, as shown in FIGURE 3a by function $f'(t)$, the high frequencies of the seismogram are emphasized. Conversely, when the seismogram function $f(t)$ is integrated, as shown in FIGURE 3c by function $f^{-1}(t)$, the low frequency content of the seismogram is emphasized. By mixing the first, and higher order, differentials of the seismogram function with the seismogram itself, the higher frequencies are reinserted back into the seismogram. Conversely, by mixing the first, and higher order, integrals of the seismogram with the seismogram itself, the lower frequencies are emphasized.

Figure 3D:
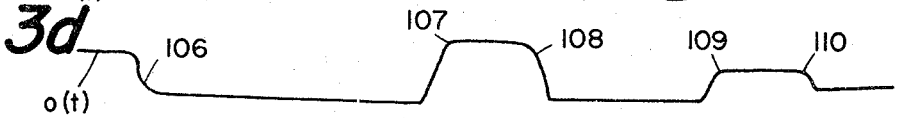
FIGURE 3d shows a seismogram function which has been inverse filtered in accordance with this invention.

When the derivatives and integrals of the seismogram are mixed in the proper proportions with the seismogram itself, a log $o(t)$ similar to that shown in FIGURE 3d may be obtained. Assuming that the wavelet 101 in FIGURE 3b is caused by a velocity contrast in the earth, that the wavelets 102 and 103 are reflections from top and bottom of a high velocity layer, and that the wavelets 104 and 105 are reflections from the top and bottom of another high velocity layer, then the seismogram will be converted to the form of FIGURE 3d wherein the steps 106, 107, 108, 109, and 110 represent velocity contrasts corresponding with the reflections 101–105 from the corresponding velocity contrasts. The mixing of the derivaties and the integrals of the seismogram function with the seismogram function itself to obtain a log similar in form to that of FIGURE 3d is disclosed in the copending U.S. application of Philip L. Lawrence, entitled Seismic Frequency Band Restoration, Ser. No. 787,645, filed Jan. 19, 1959, now U.S. Patent 3,162,756.

Figure 4:
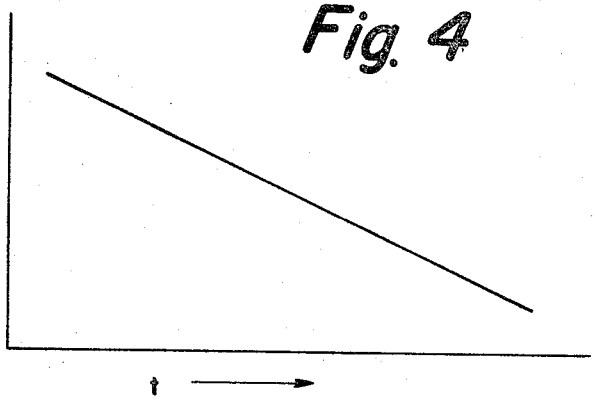
FIGURE 4 shows a plot of the control function as a function of time.

In accordance with the present invention, the proportions in which these derivatives and integrals are mixed vary with time in accordance with a time variant control function. This control function may be derived from the ratio of the magnitude of the derivative of the seismogram function to the magnitude of the seismogram function itself. Since the derivative of the seismogram function emphasizes the high frequency content, and since high frequencies in the seismogram are increasingly attenuated with time, it will be appreciated that the magnitude of the derivative of the seismogram function will decrease with time with respect to the magnitude of the seismogram function itself. Therefore, the ratio of the magnitudes is a time variant function which is indicative of the increasing high frequency attenuation with time. Such a function useful as the control function is shown in FIGURE 4.

There are other techniques for determining the manner in which the frequency attenuation varies with time. For example, the time variant control function can be determined by measuring the period of the seismogram at different times. The variation of the period with time provides an indication of the control function. Also, the control function can be computed from a Fourier or power-spectral analysis of selected portions of the seismogram functions.

Figure 1:
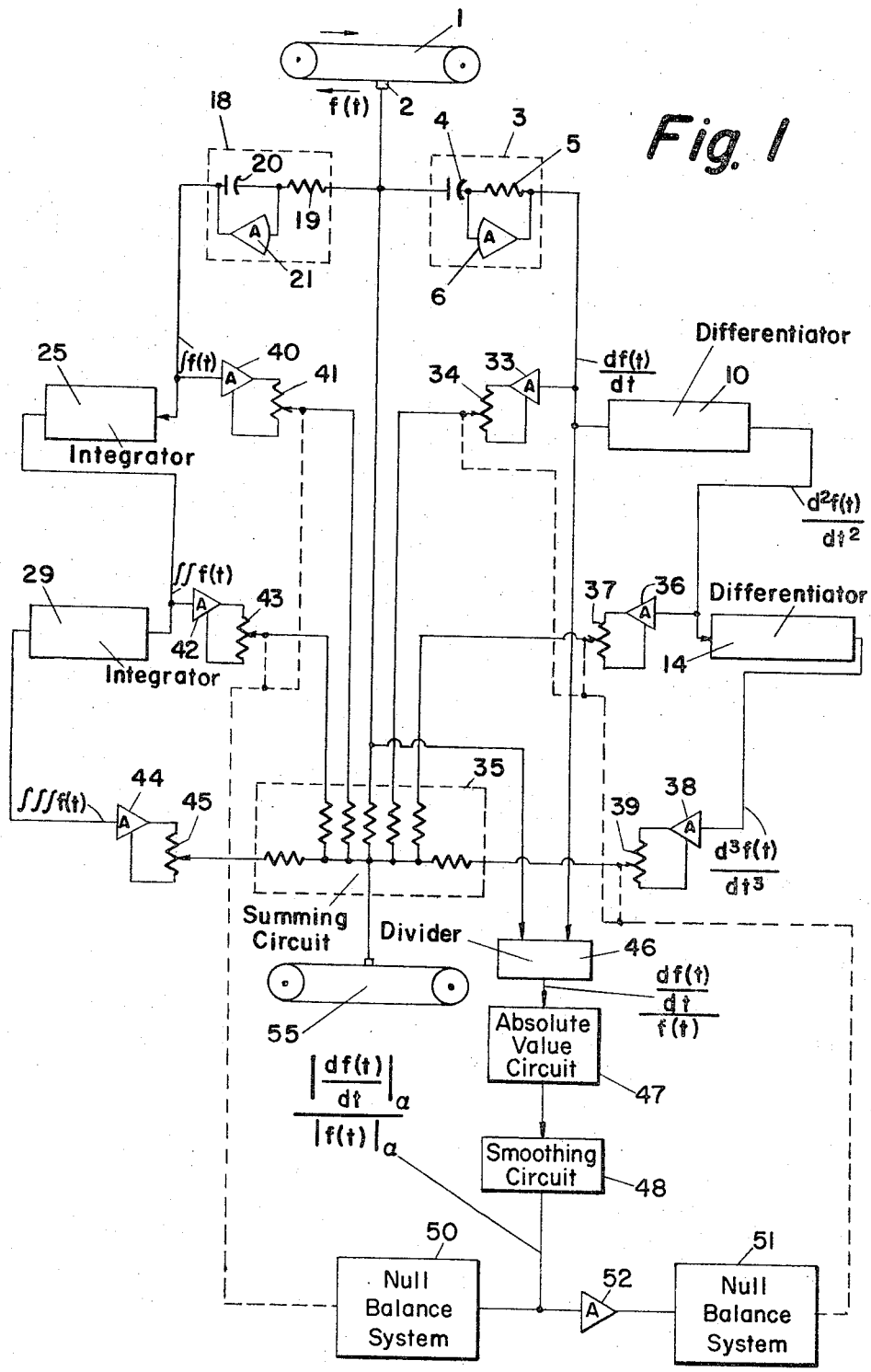
FIGURE 1 shows analog apparatus for carrying out the invention.

Analog equipment for carrying out the invention in one form thereof is shown in FIGURE 1. The seismogram function $f(t)$ is recorded on a reproducible medium such as the magnetic tape 1 which is driven beneath the pickup head 2, as is conventional.

In order to obtain the first and higher order differentials and the first and higher order integrals of the seismogram function $f(t)$, a plurality of integrators and differentiators are provided. In order to obtain the first differential of the seismogram function $f(t)$, the differentiator 3 is provided. The differentiator may take a number of forms. As shown in FIGURE 1, it includes a capacitor 4, a resistor 5 and a high gain amplifier 6. Such a circuit is shown on page 13 of Electronic Analog Computers, Korn & Korn, McGraw-Hill, second edition. The output of differentiator 3 is applied to a second differentiator 10 which produces the function $$\frac{d^2f(t)}{dt^2}$$

The function $$\frac{d^2f(t)}{dt^2}$$

is applied to a third differentiator 14 which produces the function $$\frac{d^3f(t)}{dt^3}$$

In order to produce the integrals of the function $f(t)$, a plurality of integrators are provided. The function $f(t)$ is applied to integrator 18 which is shown as including a resistor 19, a capacitor 20, and a high gain amplifier 21. Such an integrator is shown in the aforementioned Electronic Analog Computers, by Korn & Korn, page 13. The output of integrator 18, $ff(t)$, is applied to a second integrator 25 which produces the function $fff(t)$. This function is applied to a third integrator 29 which produces the function $ffff(t)$.

The functions are simultaneously mixed with the original seismogram function $f(t)$ recorded on magnetic tape 1 to inverse filter the seismogram function. In order to do this, the function $$\frac{df(t)}{dt}$$

is applied through amplifier 33 and potentiometer 34 to the summing circuit 35 to which all of the derivative and integral functions are applied. Similarly, the function $$\frac{d^2f(t)}{dt^2}$$

is applied through amplifier 36 and potentiometer 37 to summing circuit 35, and the function $$\frac{d^3f(t)}{dt^3}$$

is applied to amplifier 38 and potentiometer 39 to the summing circuit 35.

The function $ff(t)$ is applied through amplifier 40 and potentiometer 41 to summing circuit 35, the function $fff(t)$ is applied through amplifier 42 and potentiometer 43 to summing circuit 35, and the function $ffff(t)$ is applied through amplifier 44 and potentiometer 45 to summing circuit 35.

In order to control the proportions in which the various derivative and integral functions are mixed, the potentiometers 34, 37, 39, 41, 43, and 45 are provided. These potentiometers control the magnitude of the associated integral or derivative function which is applied to summing circuit 35. All of these potentiometers are varied with time by a servo system which is controlled by the control function indicative of the manner in which the frequency content of the seismogram varies with time.

In order to produce this control function, a divider 46, an absolute value circuit 47, and a smoothing circuit 48 are provided. The function $f(t)$, taken from pickup head 2, and the function $$\frac{df(t)}{dt}$$

taken from differentiator 3, are applied to the divider 46. Divider 46 produces at its output the ratio $$\frac{\frac{df(t)}{dt}}{f(t)}$$

In order to obtain the magnitude of this ratio, the output of divider 46 is first applied to the absolute value circuit 47. The output from the circuit 47 is now applied to the smoothing circuit 48 which produces at its output a function proportional to $$\frac{\left|\frac{df(t)}{dt}\right|\alpha}{|f(t)|\alpha}$$

where the vertical bars indicate the magnitude of the function smoothed over a length of time $\alpha$. A suitable absolute value circuit is shown at page 427, FIG. 6.5 of Table 6 in the above-identified text by Korn & Korn.

The smoothing circuit may comprise an integrator designed in the manner set forth at page 10 et seq. of Introduction to Electronic Analogue Computers by C. A. A. Wass, published in 1955, by McGraw-Hill Book Co., Inc. The time constant of the integrator is selected as $\alpha$, the time segment over which the output from circuit 47 is to be smoothed.

This smoothed absolute value function is used as a control signal to vary by way of suitable servo systems 50 and 51 the potentiometers 34, 37, 39, 41, 43, and 45 in a time varying manner.

The servo or null balance systems 50 and 51 which are used to position the potentiometers shown in FIGURE 1 may be of the type disclosed in U.S. Patents 2,113,164 and 2,367,746. As the control function varies with time, each null balance system will drive associated potentiometers. For example, the null balance system 50 will drive potentiometers 41, 43, and 45. Therefore, the positions of these potentiometers are changed with time to vary each of the integral functions of $f(t)$ with time.

Although the control function controls the variation of the potentiometers 41, 43, and 45 with time, the proportion of each integral to be mixed is predetermined by choosing the proper value of resistance for each of the potentiometers 41, 43, and 45. For example, it will be desirable to include less of the function $ffff(t)$ than of the function $ff(t)$. Therefore, potentiometer 45 will be set to attenuate $ffff(t)$ more than that of potentiometer 41. Furthermore, it will be desirable to include less of the function $ffff(t)$ than of the function $ff(t)$ as time progresses since low frequencies are to be reinserted more heavily early in the record time. Therefore, the potentiometer 45 may be chosen to vary linearly, logarithmically or hyperbolically so as to greatly reduce the amplitude of the higher order integral function $ffff(t)$ as time progresses in accordance with the shape of the curve of FIGURE 4. Potentiometers which vary in accordance with a nonlinear function are readily available and the proper potentiometer may be selected to give the proper mixing weights.

It has been assumed that the control function varies in a manner similar to that shown in FIGURE 4, that is, decreasing with time. Therefore, this control function is used directly to decrease the proportions of the integral functions which are mixed with time. However, it is desirable to increase the proportions of the differential functions containing the high frequencies with time. Therefore, a control function which is related to that shown in FIGURE 4, but one which increases with time, must be used to control the mixing of the differential functions. An amplifier 52 is provided for this purpose. It is preferably an amplifier of odd number of stages such that the final output has an amplitude which is inverted with respect to the initial input. The output of amplifier 52 is applied to the null balance system 51 which drives the movable contacts of potentiometers 34, 37, and 39 in a manner which increases the amplitudes of the differential functions with time. As was just described in conjunction with the integral functions, the potentiometers 34, 37, and 39 are selected to produce the proper proportions of each of the differential functions.

The operation of the analog equipment of FIGURE 1 in carrying out the subject invention is briefly outlined as follows. A function representative of a seismogram and having a frequency content which varies with time is recorded on the magnetic tape 1. This function is differentiated in differentiators 3, 10, and 14 to produce the first, second, and third differentials of the seismogram function $f(t)$. It will be appreciated that still higher order differentials may be used if desired. Each of these differential functions emphasizes the high frequency content of the seismogram.

The seismogram function is als integrated in integrators 18, 25, and 29 to produce the first, second, and third integrals of the seismogram function. These integral functions emphasize the low frequency content of the seismogram.

Next, a control function proportional to the variation of the frequency content of the seismogram with time is produced. This control function may be derived in a number of ways. As shown in FIGURE 1, it is derived from the ratio of the first derivative of the seismogram function $$\frac{df(t)}{dt}$$

to the seismogram function itself $f(t)$. This ratio is provided by the divider 46, the output of which is applied to absolute value circuit 47 to produce a function representative of the magnitude of the ratio. Since the first differential function emphasizes the high frequency content of the seismogram and since the high frequency content is decreasing with time, the ratio of the first derivative function to the semismogram itself decreases with time.

The differential functions, the integral functions, and the seismogram function itself are mixed simultaneously in the summing circuit 35 to produce an inverse filtered seismogram function at the output of summing circuit 35. This inverse filtered seismogram function is recorded on the magnetic tape 55. The proportion of mixing of the differential and integral functions is controlled by the potentiometers 34, 37, 39, 41, 43, and 45. These proportions vary with time in accordance with the control function. This control function is effective through the servo systems to control the settings of potentiometers 34, 37, 39 41, 43, and 45. The settings of the potentiometers vary with time to produce the desired time variant inverse filtering of the seismogram.

It will be understood that each of the integral, differential, control, and seismogram functions generated in the FIGURE 1 system may be recorded separately and the functions all played back simultaneously. Such method of separate recording provides opportunity to study individually each of the functions for further modification if desirable.

While this invention has been described in conjunction with analog equipment for carrying it out, it will be readily appreciated that a digital computer may be readily set up to perform inverse filtering in accordance with this technique. The seismogram function is conventionally sampled and these samples are stored in digital form to be processed by a computer. Simple programs for obtaining the differentials and the integrals of this seismogram function are readily available. It is an easy task to obtain a control function which is represented by digital values which vary with time. This digital control function may readily be used to apply particular weights to each of the sampled differential and integral functions which can then be added together to produce the desired inverse filtered seismogram.

The term "functions" has been used throughout in describing the invention; however, it will be understood that such functions are "physical signals" which can be generated and manipulated by the apparatus described.

While the invention has been described in conjunction with a particular embodiment thereof, it will be appreciated that various modifications may be made without departing from the principles of the invention. The appended claims are, therefore, intended to cover any such modifications within the true spirit and scope of the invention.

What is claimed is:

1. The method of converting a seismogram having a frequency content which varies in accordance with the variation of the frequency attenuation of the earth and instruments into a seismogram having a time invariant frequency content comprising:

generating a first electrical signal representaive of said seismogram, applying said first electrical signal to a differentiator to produce a second electrical signal representative of the magnitude of the higher frequency components of said seismogram, applying said first electrical signal to an integrator to produce a third electrical signal representative of the magnitude of the lower frequency components of said seismogram, generating from the ratio of said first and second electrical signals a control signal proportional to the absolute value of said ratio, said control signal varying in accordance with the variation in frequency content of said seismogram with time, applying said first, second and third electrical signals to amplitude controllers, applying said control signal to said amplitude controllers to change the magnitudes of said electrical signals in accordance with the magnitude of said control signal, applying the outputs of said amplitude controllers to a mixer to produce a resultant signal having an invariant frequency content, and converting said resultant signal to a seismogram having an invariant frequency content.

2. In seismic exploration wherein seismic waves are generated at a sending station and are detected at a receiving station, the method which comprises:

generating a first electrical signal representative of earth movement at said receiving station, applying said first electrical signal to a differentiator to produce a first suite of electrical signals representative of a derivative of said first signal, filtering said first signal with a filter having controllable means for changing the frequency content of the signal applied thereto, applying at least a portion of said first suite of signals to circuitry for generating an electrical control signal representative of a variation of a frequency content of said first signal with time said control signal being a function of said derivative of said first signal, and applying said control signal to said controllable means for changing the frequency content of said first signal in accordance with the variation of the frequency content of said first signal with time.

3. The method of converting a seismogram having a frequency content which varies with time in accordance with the variation of the frequency attenuation of the earth and instruments into a log representing contrasts in the subsurface layering of the earth comprising:

generating a first electrical signal representative of said seismogram, applying to a differentiator said first electrical signal to produce a second electrical signal representative of the magnitude of the higher frequency components of said seismogram, applying to an integrator said first electrical signal to produce a third electrical signal represenative of the magnitude of the lower frequency components of said seismogram, producing the ratio of said first and said second electrical signals, generating the absolute value of said ratio to produce a control electrical signal proportional to the variation of the frequency content of said seismogram with time, applying said first, second and third electrical signals to amplitude controllers, applying said control signal to said amplitude controllers to change the magnitudes of said electrical signals in accordance with the magnitude of said control signal, applying the outputs of said amplitude controllers to a mixer to produce a resultant signal having an invariant frequency control, and converting said resultant signal to a log representative of the subsurface layering of the earth.

4. The method of transforming a seismogram having a time variable frequency content into a seismogram having an equalized frequency content comprising:

generating a first electrical signal representative of said seismogram.

differentiating said first electrical signal to produce a second electrical signal representative of the magnitude of the higher frequency components of said seismogram, applying said first and second electrical signals to a ratio circuit to produce a control electrical signal proportional to the absolute value of said ratio, said control signal varying in accordance with the variation in frequency content of said seismogram with time, applying said seismogram to a filter having variable frequency characteristics, and controlling said variable frequency characteristics of said filter in accordance with the magnitude of said control signal.

References Cited by the Examiner

UNITED STATES PATENTS 2,099,536  11/1937  Scherbatskoy et al. ____ 340—3
2,304,740  12/1942  Minton _____ 340—15.5
3,209,134  9/1965  Feagin et al. _____ 340—15.5

BENJAMIN A. BORCHELT, *Primary Examiner.*

SAMUEL FEINBERG, *Examiner.*

R. M. SKOLNIK, *Assistant Examiner.*

UNITED STATES PATENT OFFICE
CERTIFICATE OF CORRECTION

Patent No. 3,312,933                                                                 April 4, 1967

Philip L. Lawrence et al.

It is hereby certified that error appears in the above numbered patent requiring correction and that the said Letters Patent should read as corrected below.

Column 1, line 8, for "processiing" read -- processing --; column 2, line 48, for "to" read -- the --; column 3, line 10, for "derivaties" read -- derivatives --; column 4, lines 2 and 27, and column 5, lines 20 and 23, for "ff(t)", each occurrence, read -- ∫f(t) --; column 4, lines 4 and 29, for "fff(t)", each occurrence, read -- ∫∫f(t) --; lines 5 and 30, and column 5, lines 19, 21, 23 and 28, for "ffff(t)", each occurrence, read -- ∫∫∫f(t) --; column 5, line 67, for "als" read -- also --; column 6, line 13, for "semismogram" read -- seismogram --; line 26, for "39" read -- 39, --; column 7, line 33, for "time" read -- time, --; column 8, line 24, for "seismogram." read -- seismogram, --.

Signed and sealed this 7th day of November 1967.

(SEAL)
Attest:

EDWARD M.FLETCHER,JR.                                       EDWARD J. BRENNER
Attesting Officer                                               Commissioner of Patents